L. G. ZESBAUGH AND H. ANDERSON.
ELEVATING APPARATUS.
APPLICATION FILED APR. 21, 1921.

1,432,513.

Patented Oct. 17, 1922.
6 SHEETS—SHEET 1.

INVENTORS:
L. G. ZESBAUGH.
H. ANDERSON.
By
Whiteley and Ruckman
ATTORNEYS.

L. G. ZESBAUGH AND H. ANDERSON.
ELEVATING APPARATUS.
APPLICATION FILED APR. 21, 1921.

1,432,513.

Patented Oct. 17, 1922.
6 SHEETS—SHEET 2.

INVENTORS:
L. G. ZESBAUGH.
H. ANDERSON.
BY Whiteley and Ruckman
ATTORNEYS.

L. G. ZESBAUGH AND H. ANDERSON.
ELEVATING APPARATUS.
APPLICATION FILED APR. 21, 1921.

1,432,513. Patented Oct. 17, 1922.
6 SHEETS—SHEET 5.

INVENTOR
L. G. ZESBAUGH.
H. ANDERSON.
BY Whiteley and Ruckman
ATTORNEYS.

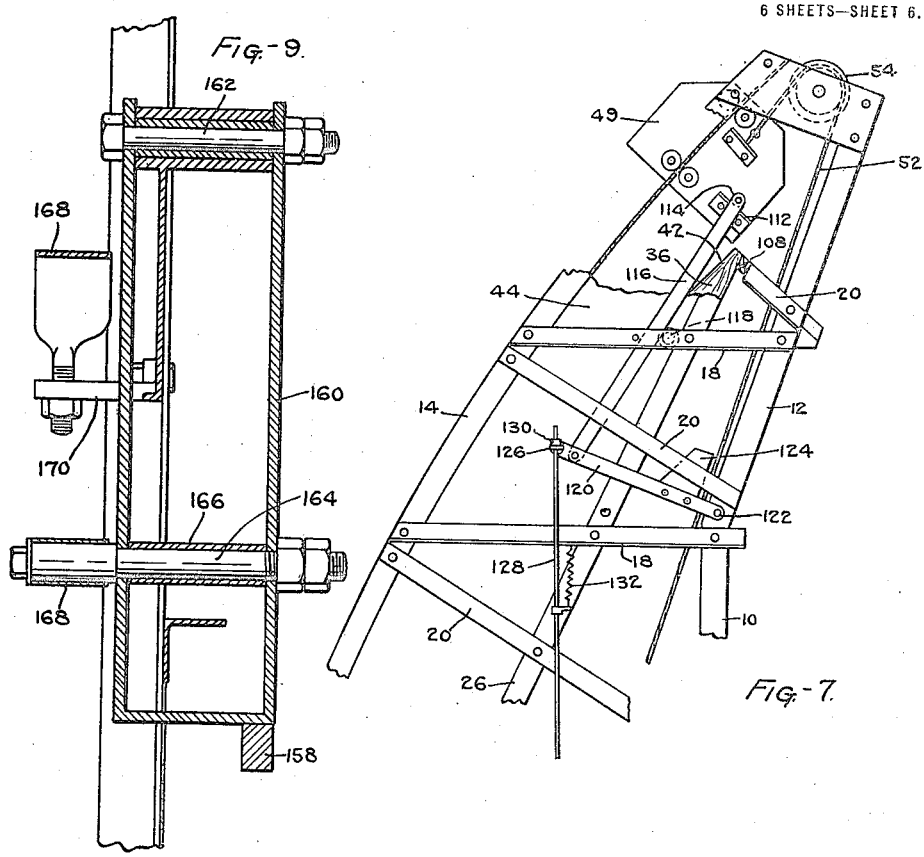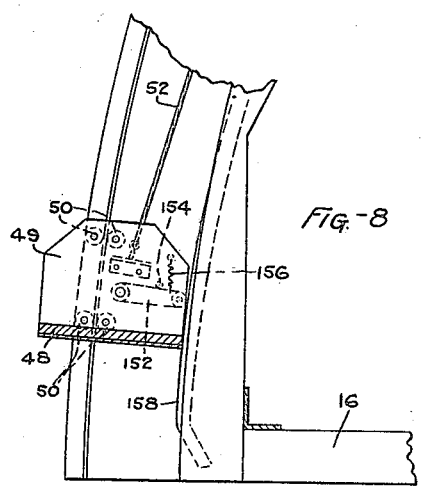

Patented Oct. 17, 1922.

1,432,513

UNITED STATES PATENT OFFICE.

LAWRENCE G. ZESBAUGH AND HELMER ANDERSON, OF MINNEAPOLIS, MINNESOTA, ASSIGNORS TO WASHBURN-CROSBY COMPANY, OF MINNEAPOLIS, MINNESOTA, A CORPORATION.

ELEVATING APPARATUS.

Application filed April 21, 1921. Serial No. 463,277.

*To all whom it may concern:*

Be it known that we, LAWRENCE G. ZESBAUGH and HELMER ANDERSON, citizens of the United States, residing at Minneapolis, in the county of Hennepin and State of Minnesota, have invented certain new and useful Improvements in Elevating Apparatus, of which the following is a specification.

Our invention relates to elevating apparatus and while intended particularly for elevating sacks of flour in mills, it is obvious that the apparatus may be used for elevating other packages and articles. An object of the invention is to provide apparatus which will receive the sacks directly from a hand truck and after elevating them will discharge the same one at a time to any suitable device, such as a conveyor belt running adjacent the upper end of the apparatus. An object in particular is to provide an apparatus having a carrier which when a pile of sacks are deposited thereon automatically moves upwardly, discharges the sacks one at a time at the upper end of the apparatus and then automatically returns to initial position for receiving another load of sacks.

The full objects and advantages of our invention will appear in connection with the detailed description thereof and the novel features embodied in our inventive idea will appear in connection with the claims.

Referring to the accompanying drawings, which illustrate the application of our invention in one form,—

Figure 1:
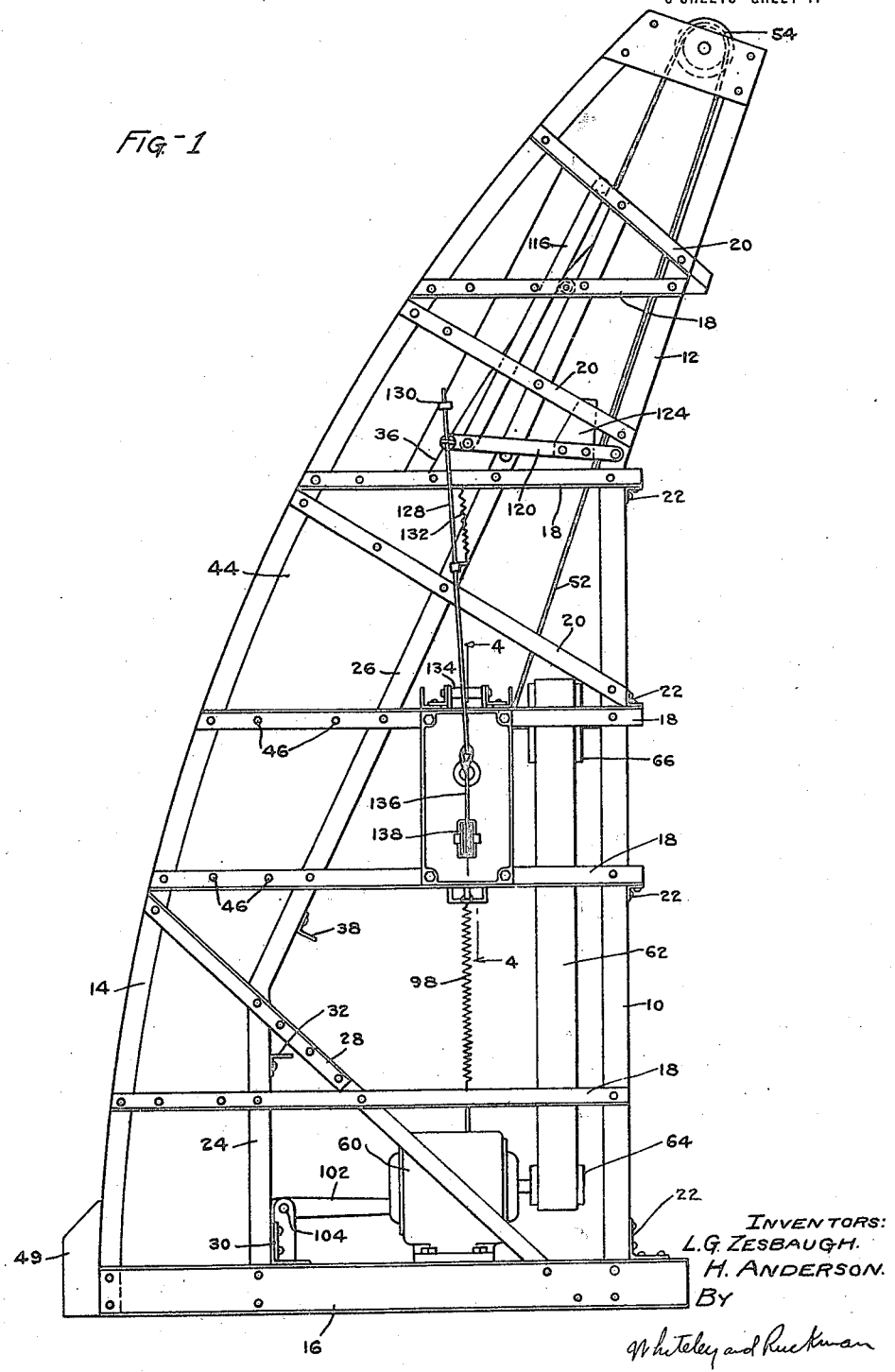
Figure 2:
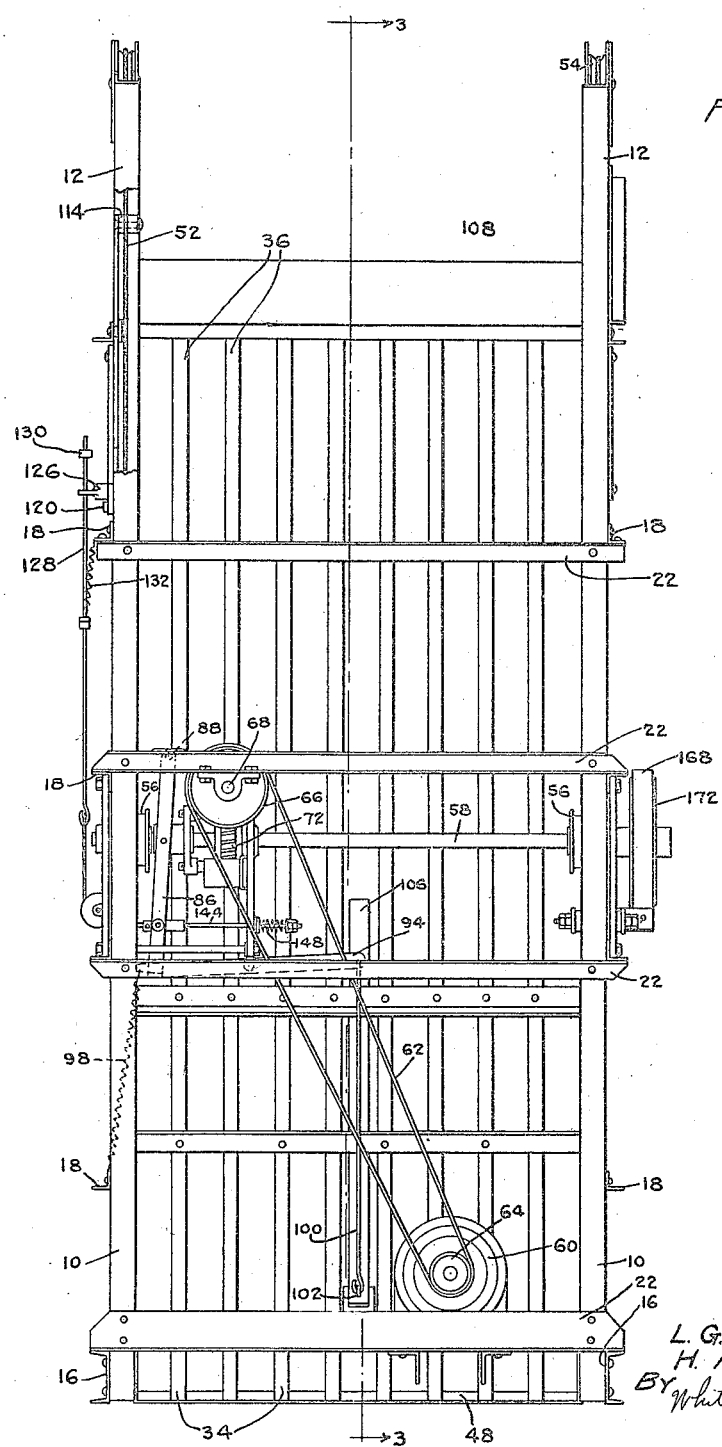
Figure 3:
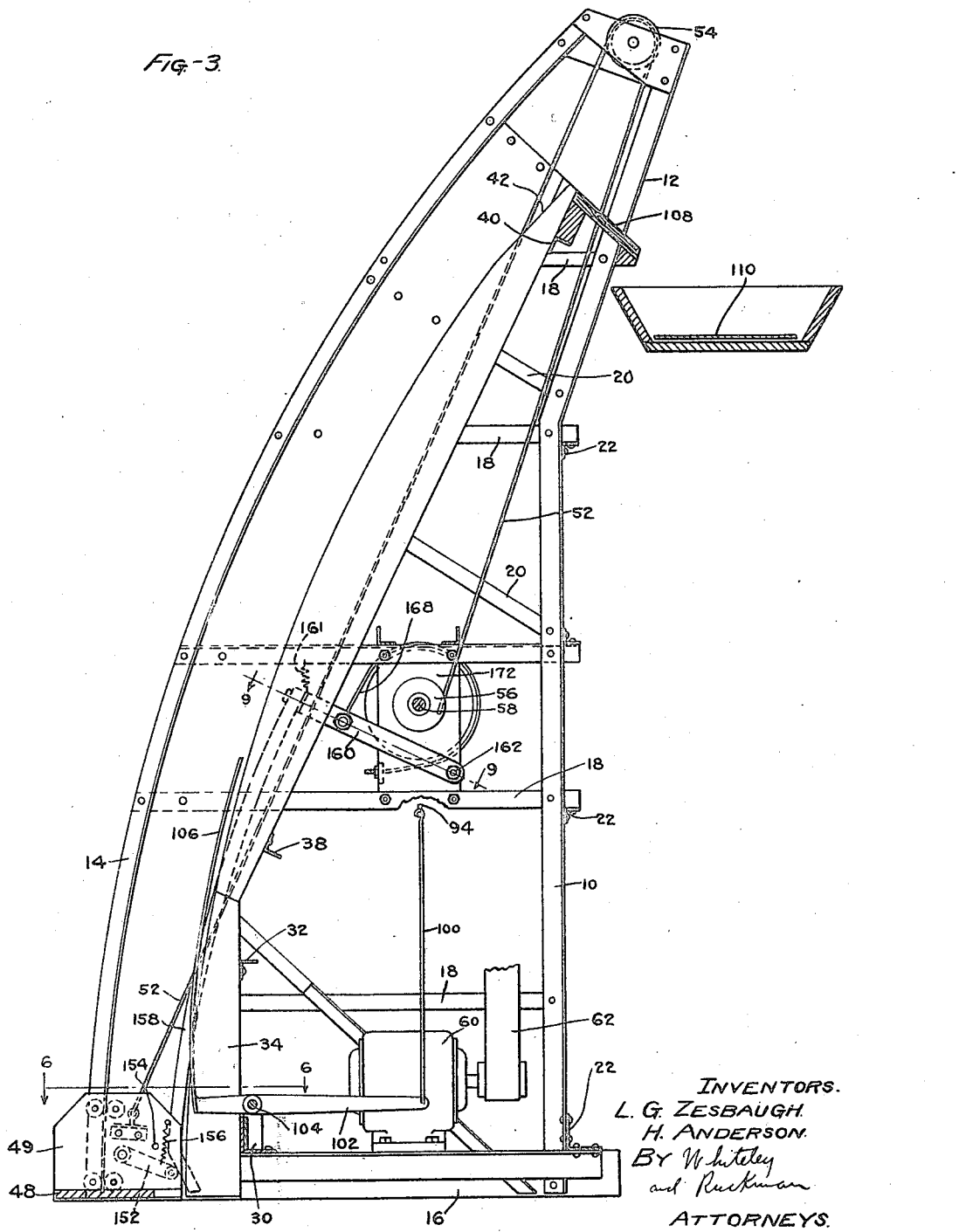
Figure 4:
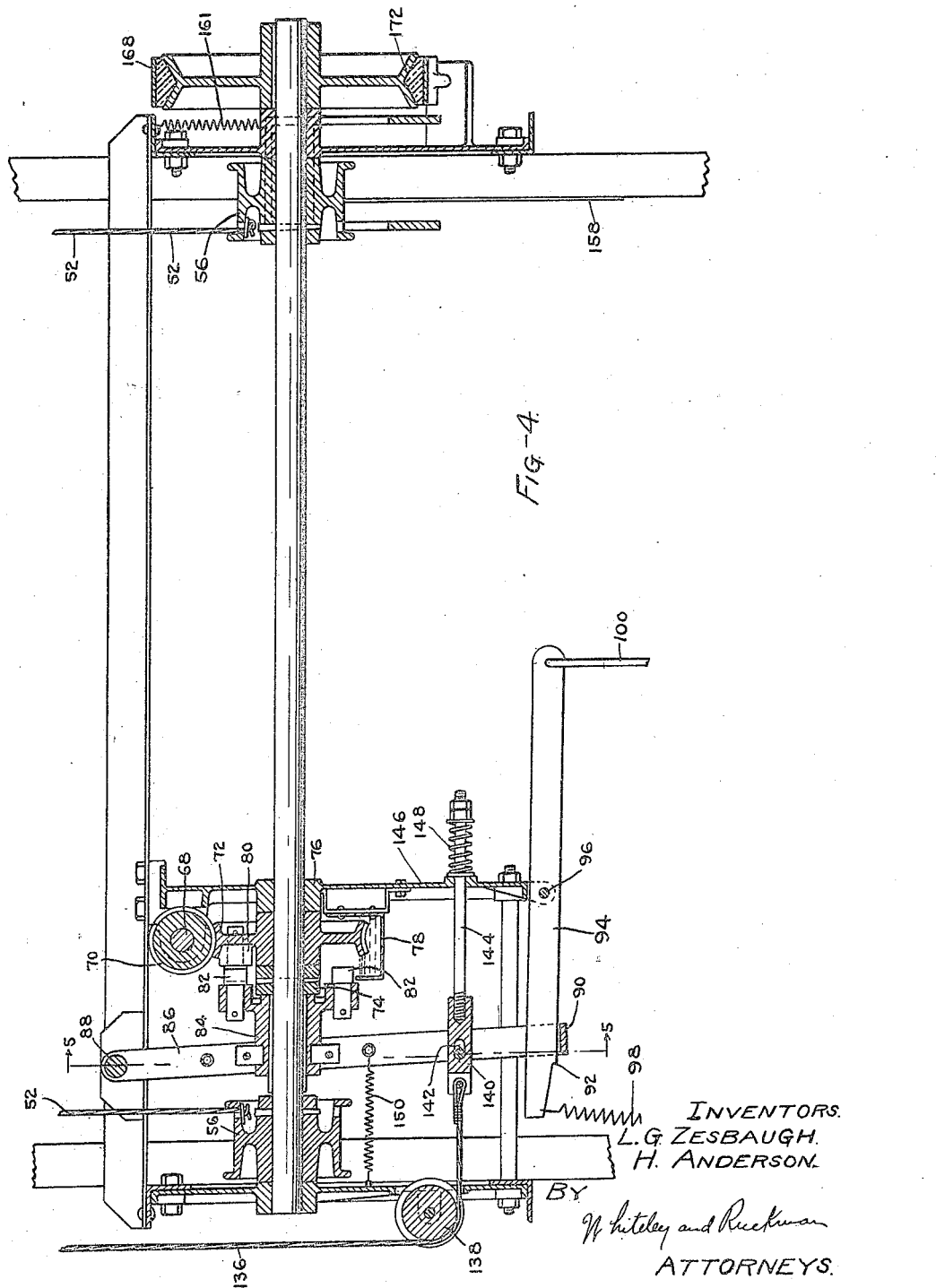
Figure 5:
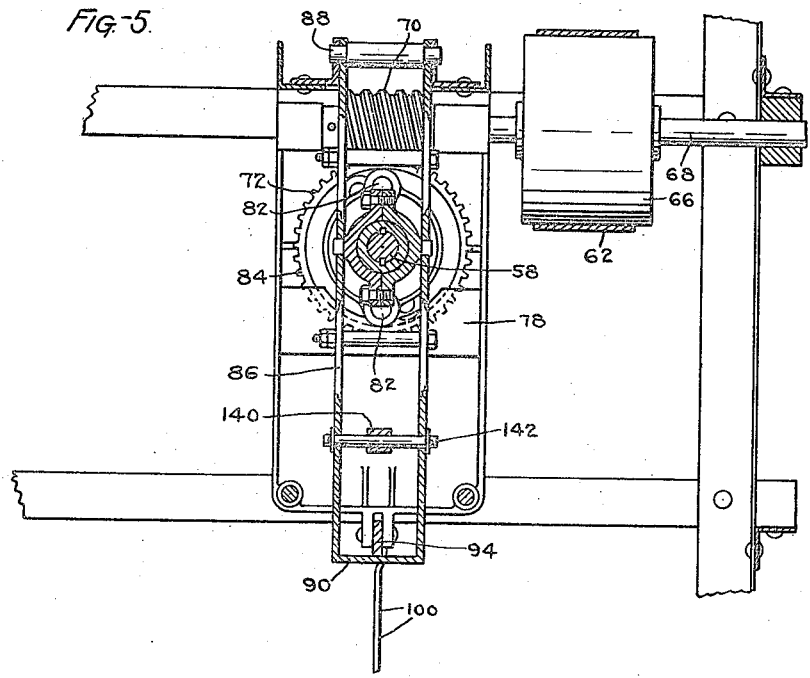
Figure 6:
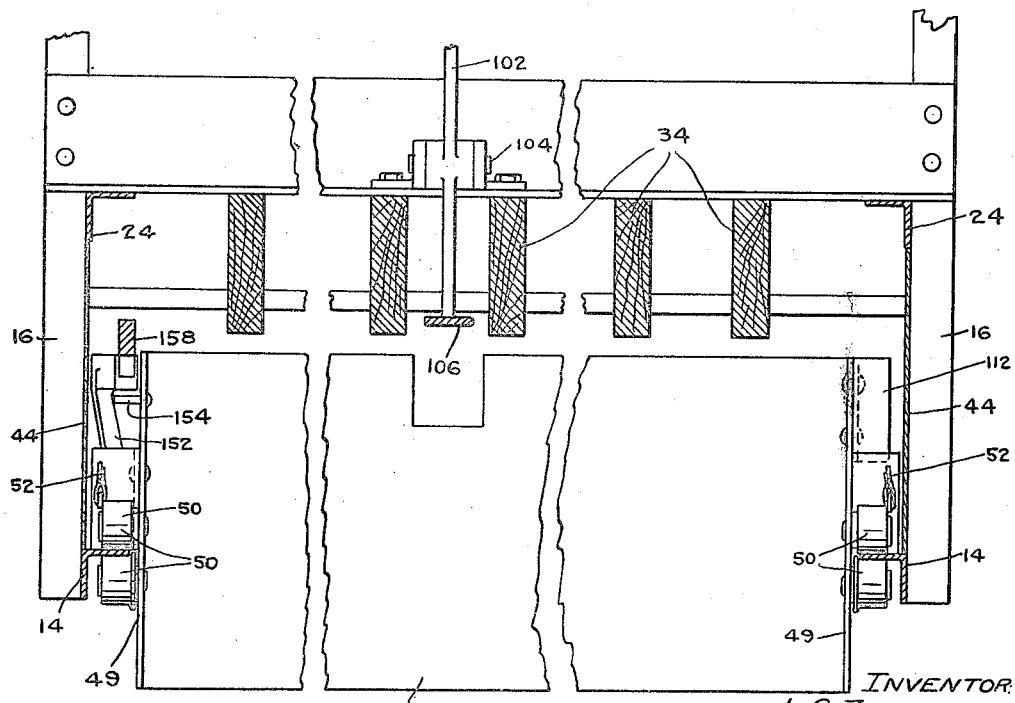

Fig. 1 is a side elevational view of our machine. Fig. 2 is a rear elevational view thereof. Fig. 3 is a view in vertical section on the line 3—3 of Fig. 2. Fig. 4 is a view in vertical section on the line 4—4 of Fig. 1. Fig. 5 is a view in vertical section on the line 5—5 of Fig. 4. Fig. 6 is a view in horizontal section on the line 6—6 of Fig. 3. Fig. 7 is a detail view of the upper portion of the machine. Fig. 8 is a detail view of the lower portion of the machine. Fig. 9 is a view in section on the line 9—9 of Fig. 3.

As shown in the drawings, we provide a suitable frame which includes two rear corner posts 10, the upper portions 12 of which are rearwardly inclined and two curved members 14 which are connected to the members 10 and 12 by base members 16, horizontal bars 18 and inclined bars 20. The two posts 10 are connected by bars 22 but the members 14 are not directly connected to each other, so that a space is left between them for a purpose which will presently appear. Spaced from the members 14 are members which have upright portions 24 at each side of the machine and rearwardly-inclined portions 26 extending toward the top of the machine. Reenforcing bars 28 extend across the portions 24 near the place where they are attached to the inclined portions 26. Transverse bars 30 and 32 extend between the two vertical members 24 and a plurality of vertical grid or rib members 34 are secured to these two bars. Extending from the tops of the rib members 34 are a plurality of grid or rib members 36 which are secured to transverse bars 38 and 40. As best shown in Fig. 3, the grid members 34 and 36, respectively, are so constructed and fitted together that their forward edges form a curve which is concentric with relation to the curved members 14 except that the upper ends of the members 36 are beveled at 42. The space at the two sides of the machine between the members 14 and the conjoint members 24 and 26 is filled in with sheet steel plates 44 secured to the bars 18 by rivets or bolts 46, as will appear from Fig. 1. It will now be understood that a curved rearwardly deflected slide-way is formed between the members 14 and that the grid members 34 and 36 limit the rear of this slide-way. Adapted to move up and down this slide-way is a carrier or platform 48 having end plates 49 on which are mounted pairs of rollers 50 engaging the rear and front surfaces of flanges on the members 14 by means of which the carrier is guided in its reciprocating movement. Attached to the end plates 49 are cables 52 which pass over rollers 54 at the top of the machine and then extend downwardly so as to be secured to winding drums 56 secured to a shaft 58. For driving this shaft at the proper time an electric motor 60 is mounted on the lower portion of the frame and a belt 62 runs over a pulley 64 secured to the driving shaft of the motor and over a pulley 66 secured to the shaft 68. Secured to this latter shaft is a worm 70 which meshes with a worm wheel 72 loosely mounted on the shaft 58 and held between collars 74 and 76 so as to rotate in an oil receptacle 78. One side of the worm gearing 72 is provided with a boss 80 carrying clutch pins adapted to be engaged by cooperating clutch pins 82 carried by a clutch member 84 splined on the shaft 58. The clutch member 84 is engaged by a shifting arm 86 pivoted at one end at 88, the other end having a shoulder 90 adapted to be engaged by a shoulder 92 on one arm of a lever 94 pivoted at 96, and this end of the lever is normally held downwardly by a spring 98. Secured to the other arm of this lever is a flexible member 100, the lower end of which is secured to the rear end of a lever 102 pivoted at 104. The forward portion of this latter lever is provided with an upwardly extending operating bar 106, the upper portion of which normally extends forwardly between two of the grid members so that when a pile of sacks of flour or other articles are deposited upon the platform 48 the bar 106 will be forced rearwardly and depress the rear end of the lever 102 to cause the flexible element 100 to lift the end of the lever 94 provided with the shoulder 92, and thus release the shifting arm 86 which then shifts the clutch member 84 into the clutching position shown in Fig. 4. This causes the shaft 58 to rotate and wind the cables 52 on the drums 56, and the platform is drawn upwardly, passing along the curved members 14, so that it gradually tips from a horizontal position into the inclined position shown in Fig. 7. The sacks or other articles are supported by the grid members during the upward travel of the platform and when the upper one of the pile reaches the beveled upper portions 42 of the grid members and finally passes above the grid members, it slides rearwardly, owing to the inclined position of the platform, and slides down an inclined plate 108 upon a conveyor belt 110 which carries it away. The packages are thus deposited one at a time upon the conveyor belt without piling up thereon. As best shown in Fig. 7 a projection 112 is secured to one of the end plates 49 and when the platform reaches the upper limit of its travel, as shown in this figure, the projection 112 engages a roller 114 mounted on the upper end of an arm 116 which rests upon a roller 118 mounted on the frame. The lower end of the arm 116 is pivotally attached to an arm 120 which in turn is pivoted to the frame at 122 and is provided with a guide 124. The free end of the arm 120 is provided with a lug 126 having a hole through which a rod 128 loosely extends, this rod having an enlargement 130 at its upper end and this rod being normally maintained in an upward position by a spring 132 as shown in Fig. 1. The rod 128 rests upon a roller 134 mounted on the frame, and to the lower end of the rod is attached a cord 136 which engages a roller 138 on the frame. The lower end of the cord 136 is attached to a slotted member 140 through the slot of which extends a pin 142 on the shifting arm 86. The member 140 is provided with a rod 144 which extends slidably through a plate 146 and is encircled by a spring 148 interposed between the plate and a nut on the end of the rod. A spring 150 tends to pull the arm 86 toward the left as viewed in Fig. 4, so that the pin 142 will be in the left-hand end of the slot. When the cord 136 is pulled by the action of the member 112 on the platform the shifting arm 86 is drawn to the left to disengage the clutch and the arm is retained in this position by engagement of the shoulder 92 with the shoulder 90 on the arm. The spring 132 serves to take up slack in the cord 136. When the clutch is disengaged the platform is left free to return to its initial position by gravity. In order to check the descent of the platform when it is approaching its downward position the following mechanism is provided. Pivotally attached to the end plate 49, which is opposite the end plate to which the projection 112 is attached, is a finger 152 which is normally held upwardly against a stop 154 by a spring 156 as shown in Fig. 8. Arranged for engagement by this finger is a curved bar 158 which is free to move at its lower end and the upper end of which is secured to the forward end of an arm 160 which is held up by a spring 161, the rear end of the arm being pivoted at 162. As shown in Fig. 9, the arm 160 has two parallel members connected at the forward end and a rod 164 passes through the two members, this rod being surrounded by a spacing sleeve 166. To the projecting end of the rod 164 is secured one end of a brake band 168, the other end of which is secured to a projection 170 extending out from the frame. The brake band encircles a brake drum 172 secured to the shaft 58, as best shown in Fig. 4. The operation of the brake will be obvious from Figs. 3 and 8. As the platform approaches its downward position the finger 152 pushes the bar 158 rearwardly, thereby pulling downwardly upon the movable end of the brake band 168 and drawing the latter into engagement with the brake drum 172.

The operation and advantages of our invention have to a large extent been set forth in the detailed description thereof. A pile of sacks or other articles are deposited upon the platform in suitable manner as, for instance, by dumping them directly from the hand truck. The operation of the apparatus is entirely automatic, the platform automatically starting upwardly and after the articles have been automatically discharged one at a time from the top of the pile the platform descends by gravity, its downward movement being gradually checked by the brake when the platform approaches its lowermost position. The curved track saves floor space and causes the platform to be tilted as it approaches its upward position. A positive clutch release is provided and the clutch is locked in its released position until caused to operate by the depositing of the load on the platform.

We claim:

1. An elevating apparatus comprising a frame, guideways supported by said frame, a carrier mounted for movement on said guideways, a movable member mounted on said frame for operation by articles deposited on said carrier when in its lower position, a driving member, and connections operated by said movable member for causing said driving member to move said carrier upwardly.

2. An elevating apparatus comprising a frame, guideways supported by said frame, a carrier mounted for reciprocating movement on said guideways, a movable member mounted on said frame for operation by articles deposited on said carrier when in its lower position, a driving member, connections operated by said movable member for causing said driving member to move said carrier upwardly, and means for releasing said carrier when it reaches its upper position.

3. An elevating apparatus comprising a frame, guideways supported by said frame, a carrier mounted for reciprocating movement on said guideways, a movable member operated by articles deposited on said carrier when in its lower position, a driving shaft, a clutch associated with said driving shaft, connections operated by said movable member for engaging said clutch to cause said carrier to move upwardly, and means for disengaging said clutch when said carrier reaches its upper position.

4. An elevating apparatus comprising a frame, curved guideways supported by said frame, a carrier mounted for reciprocating movement on said guideways, a movable member in juxtaposition to said carrier for operation by articles deposited thereon when in its lower position, said guideways being so arranged as to retain said carrier horizontally when it is in lower position and to tilt it for discharging articles carried thereby when in its upper position, a driving member, means operated by said movable member for causing said driving member to move said carrier upwardly, and means for releasing said carrier when it reaches its upper position.

5. An elevating apparatus comprising a frame, guideways supported by said frame, a carrier mounted for reciprocating movement upon said guideways, a movable member operated by articles deposited on said carrier when in its lower position, a driving shaft, a clutch associated with said driving shaft, connections operated by said movable member for engaging said clutch to cause said carrier to move upwardly, means for disengaging said clutch when said carrier reaches its upper position, a brake associated with said driving shaft, and means for causing said brake to become operative when said carrier is approaching its lower position.

6. An elevating apparatus comprising a frame, guideways supported by said frame, a carrier mounted for reciprocating movement on said guideways, a movable member in juxtaposition to said carrier for operation by articles deposited thereon when in its lower position, a lever operated by said movable member, a driving shaft, a clutch associated with said driving shaft, a shifting arm for sliding the movable member of said clutch, said shifting arm being normally engaged by a shoulder on said lever for holding said movable clutch member in unclutched position, means operated by said driving shaft for causing said carrier to move upwardly, a spring associated with said shifting arm for moving the latter into juxtaposition when released by said engaging shoulder, a member operatively connected to said shifting lever for pulling the latter in opposition to the tension of said spring, and means associated with said carrier for operating said member when the carrier reaches its upper position whereby said movable clutch member is moved into unclutched position to release said carrier.

7. An elevating apparatus comprising a frame, curved guideways supported by said frame, a plurality of grid members concentric with said curved guideways and arranged to limit the rear of the slide-way between said guideways, a platform mounted for reciprocating movement on said guideways, an operating member normally in front of said grid members for operation by articles deposited on said platform, a lever operated by said operating member, a driving shaft, a clutch associated with said driving shaft, a shifting arm for sliding the movable member of said clutch, said shifting arm being normally engaged by a shoulder on said lever for holding said movable clutch member in unclutched position, a pair of winding drums operated by said shaft, cables secured at one end of said winding drums and at their other ends to said platforms, a spring associated with said shifting arm for moving the latter into clutched position when released from said engaging shoulder, a member operatively connected to said shifting lever for pulling the latter in opposition to the tension of said spring, means associated with said platform for operating said member when the platform reaches its upper position whereby said movable clutch member is moved into unclutched position to release said platform, and means for gradually checking the movement of said platform as it approaches its lower position.

8. An elevating apparatus comprising a frame, curved guideways supported by said frame, a plurality of grid members concentric with said curved guideways and arranged to limit the rear of the slide-way between said guideways, a platform mounted for reciprocating movement on said guideways, an operating bar normally extending forwardly between two of said grid members for operation by articles deposited on said platform, a lever operated by said operating bar, a driving shaft, a clutch associated with said driving shaft, a shifting arm for sliding the movable member of said clutch, said shifting arm being normally engaged by a shoulder on said lever for holding said movable clutch member in unclutched position, a pair of winding drums secured to said driving shaft, cables secured at one end to said winding drums and at their other ends to said platform, a spring associated with said shifting arm for moving the latter into clutched position when released from said engaging shoulder, a member operatively connected to said shifting lever for pulling the latter in opposition to the tension of said spring, a projection on said platform adapted to operate said member when the platform reaches its upper position whereby said movable clutch member is moved into unclutched position to release said platform, a brake associated with said driving shaft, a downwardly-operating finger attached to said platform, and a member adapted to be operated by said finger when said platform is approaching its lower position for causing said brake to become operative.

9. An elevating apparatus comprising a frame, curved guideways supported by said frame, a plurality of grid members concentric with said curved guideways and arranged to limit the rear of the slide-way between said guideways, a platform mounted for reciprocating movement on said guideways, an operating bar normally extending forwardly between two of said grid members for operation by articles deposited on said platform, a lever operated by said operating bar, a driving shaft, a clutch associated with said driving shaft, a shifting arm for sliding the movable member of said clutch, said shifting arm being normally engaged by a shoulder on said lever for holding said movable clutch member in unclutched position, a pair of winding drums secured to said driving shaft, cables secured at one end to said winding drums, rollers at the upper end of said frame and over which said cables pass, the other ends of said cables being secured to said platform, a spring associated with said shifting arm for moving the latter into clutching position when released from said engaging shoulder, a cord operatively connected at its lower end to said shifting lever for pulling the latter in opposition to the tension of said spring, a slidable rod to which the upper end of said cord is attached, an arm engaging said rod for moving the latter upwardly, a projection on said platform for operating said arm when the platform reaches its upper position whereby said movable clutch member is moved into unclutched position to release said platform, a brake drum secured to said driving shaft, a brake band encircling said drum, a downwardly-operative finger attached to said platform, an operating bar adapted to be operated by said finger when said platform is approaching its lower position, and connections between said bar and said brake band for drawing the latter into engagement with said brake drum.

In testimony whereof we hereunto affix our signatures.

LAWRENCE G. ZESBAUGH.
HELMER ANDERSON.